(12) United States Patent
Bangel et al.

(10) Patent No.: US 9,053,164 B2
(45) Date of Patent: Jun. 9, 2015

(54) METHOD, SYSTEM, AND PROGRAM PRODUCT FOR USING ANALYSIS VIEWS TO IDENTIFY DATA SYNCHRONIZATION PROBLEMS BETWEEN DATABASES

(75) Inventors: Matthew J. Bangel, Poughkeepsie, NY (US); Gregory V. Feeney, Wappingers Falls, NY (US); Robert G. Madsen, Apalachin, NY (US); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 11/122,584

(22) Filed: May 5, 2005

(65) Prior Publication Data

US 2006/0253485 A1    Nov. 9, 2006

(51) Int. Cl.
*G06F 7/00* (2006.01)
*G06F 17/00* (2006.01)
*G06F 17/30* (2006.01)

(52) U.S. Cl.
CPC .................. *G06F 17/30578* (2013.01)

(58) Field of Classification Search
CPC .......... G06F 11/2082; G06F 17/30174; G06F 2009/44; Y10S 707/99955; Y10S 707/99952
USPC .................. 707/203, 100, 200, 201
See application file for complete search history.

(56) References Cited

U.S. PATENT DOCUMENTS

| | | | |
|---|---|---|---|
| 5,765,139 A * | 6/1998 | Bondy | 705/7.24 |
| 5,878,416 A | 3/1999 | Harris et al. | |
| 5,881,371 A | 3/1999 | Reynolds | |
| 5,893,110 A | 4/1999 | Weber et al. | |
| 5,897,640 A * | 4/1999 | Veghte et al. | 707/202 |
| 5,920,846 A | 7/1999 | Storch et al. | |
| 5,930,791 A | 7/1999 | Leu | |
| 5,937,415 A | 8/1999 | Sheffield et al. | |
| 6,081,806 A * | 6/2000 | Chang et al. | 707/8 |
| 6,212,529 B1 * | 4/2001 | Boothby et al. | 707/201 |
| 6,223,187 B1 * | 4/2001 | Boothby et al. | 707/201 |
| 6,353,835 B1 * | 3/2002 | Lieuwen | 707/203 |

(Continued)

FOREIGN PATENT DOCUMENTS

WO    03052557 A2    6/2003

OTHER PUBLICATIONS

U.S. Appl. No. 11/340,306 Non-Final Office Action dated Feb. 13, 2008.

(Continued)

*Primary Examiner* — Augustine K Obisesan
(74) *Attorney, Agent, or Firm* — Matthew H. Chung; Hoffman Warnick LLC

(57) ABSTRACT

The present invention provides a method, system, and computer program product for identifying data synchronization problems between data in different databases. The method includes: providing first and second databases containing common data; generating a summary of the common data as present in the first database; generating a summary of the common data as present in the second database; determining at least one delta value for the common data between the first and second databases; and generating an analysis view displaying the summary of the common data as present in the first database, the summary of the common data as present in the second database, and the at least one delta value for the common data between the first and second databases.

12 Claims, 3 Drawing Sheets

(56) References Cited

U.S. PATENT DOCUMENTS

| | | | |
|---|---|---|---|
| 6,421,571 B1 | 7/2002 | Spriggs et al. | |
| 6,466,951 B1* | 10/2002 | Birkler et al. | 707/201 |
| 6,470,329 B1* | 10/2002 | Livschitz | 707/1 |
| 6,493,727 B1* | 12/2002 | Huang et al. | 707/201 |
| 6,516,327 B1* | 2/2003 | Zondervan et al. | 707/200 |
| 6,532,480 B1* | 3/2003 | Boothby | 1/1 |
| 6,625,598 B1* | 9/2003 | Kraffert | 707/3 |
| 6,799,190 B1* | 9/2004 | Boothby | 707/204 |
| 6,868,397 B1 | 3/2005 | McCaslin | |
| 6,985,955 B2 | 1/2006 | Gullotta et al. | |
| 7,013,315 B1* | 3/2006 | Boothby | 707/203 |
| 7,024,420 B2 | 4/2006 | Ball et al. | |
| 7,143,117 B2* | 11/2006 | Wolfgang et al. | 707/200 |
| 2002/0120638 A1 | 8/2002 | Boehmke | |
| 2002/0161784 A1 | 10/2002 | Tarenskeen | |
| 2002/0194045 A1 | 12/2002 | Shay et al. | |
| 2003/0046307 A1* | 3/2003 | Rivette et al. | 707/104.1 |
| 2003/0074378 A1 | 4/2003 | Midgley et al. | |
| 2003/0078813 A1* | 4/2003 | Haskell et al. | 705/3 |
| 2003/0177119 A1* | 9/2003 | Cole | 707/7 |
| 2004/0139128 A1 | 7/2004 | Becker et al. | |
| 2005/0060116 A1* | 3/2005 | Yeung | 702/120 |
| 2005/0144520 A1 | 6/2005 | Tuma et al. | |
| 2005/0187986 A1* | 8/2005 | Selman et al. | 707/200 |
| 2005/0189122 A1* | 9/2005 | Wippich | 169/43 |
| 2005/0192973 A1* | 9/2005 | Sperling et al. | 707/100 |
| 2005/0262166 A1 | 11/2005 | Rajeev et al. | |
| 2006/0010154 A1 | 1/2006 | Prahlad et al. | |
| 2006/0015805 A1* | 1/2006 | Humenansky et al. | 715/503 |
| 2006/0069688 A1* | 3/2006 | Shekar | 707/100 |

OTHER PUBLICATIONS

U.S. Appl. No. 11/340,306 Final Office Action dated Jul. 25, 2008.

U.S. Appl. No. 11/340,306 Non-Final Office Action dated Feb. 24, 2009.

U.S. Appl. No. 11/340,306 Final Office Action dated Aug. 17, 2009.

U.S. Appl. No. 11/340,306 Non-Final Office Action dated Jan. 13, 2010.

U.S. Appl. No. 11/340,306 Notice of Allowance dated Jun. 2, 2010.

Jenkins et al., "Fundamentals of Optics," Third Edition, McGraw-Hill Book Company, Inc., New York, 1957.

"Tangram Partners with Datasign AG to meet growing European demand for Lifecycle IT asset management," Newswire, Nov. 5, 2001.

"Smurfit-Stone upgrades to Datastream 7i; company expects substantial savings from industry's first web-architected enterprise asset management solution," PR Newswire, Oct. 29, 2001.

"Tangram pioneers new lifecycle asset management methodology," PR Newswire, Apr. 26, 2001.

"The Home Depot Selects ON Technology Solution for Centralized Management of 150,000 plus retail workstations," PR Newswire, Dec. 3, 2001.

"Tangram offers product exchange program to remedy asset management customers," Business Wire, Oct. 9, 2001.

U.S. Appl. No. 10/040,844 Abandonment Notice dated Dec. 1, 2006.

U.S. Appl. No. 10/040,844 Non-final Office Action dated Feb. 16, 2006.

* cited by examiner

METHOD, SYSTEM, AND PROGRAM PRODUCT FOR USING ANALYSIS VIEWS TO IDENTIFY DATA SYNCHRONIZATION PROBLEMS BETWEEN DATABASES

BACKGROUND OF THE INVENTION

1. Field of the Invention

The present invention generally relates to computer systems. More particularly, the present invention provides a method, system, and computer program product for using analysis views to identify data synchronization problems between common data in different databases.

2. Related Art

It is a frequent requirement that the data in one database application be kept "in synch" with the data in another similar, yet distinct, database application. Unfortunately, unknown programming errors, network problems or other unforeseen circumstances may cause the databases to get "out of synch." No facility exists to effectively monitor such conditions.

SUMMARY OF THE INVENTION

In general, the present invention provides a method, system, and computer program product for using analysis views to identify data synchronization problems between common data in different databases.

A first aspect of the present invention is directed to a method for identifying data synchronization problems, comprising: providing first and second databases containing common data; generating a summary of the common data as present in the first database; generating a summary of the common data as present in the second database; determining at least one delta value for the common data between the first and second databases; and generating an analysis view displaying the summary of the common data as present in the first database, the summary of the common data as present in the second database, and the at least one delta value for the common data between the first and second database.

A second aspect of the present invention is directed to a system for identifying data synchronization problems, comprising: means for providing first and second databases containing common data; means for generating a summary of the common data as present in the first database; means for generating a summary of the common data as present in the second database; means for determining at least one delta value for the common data between the first and second databases; and means for generating an analysis view displaying the summary of the common data as present in the first database, the summary of the common data as present in the second database, and the at least one delta value for the common data between the first and second databases.

A third aspect of the present invention is directed to a program product stored on a computer readable medium for identifying data synchronization problems, the computer readable medium comprising program code for performing the following steps: providing first and second databases containing common data; generating a summary of the common data as present in the first database; generating a summary of the common data as present in the second database; determining at least one delta value for the common data between the first and second databases; and generating an analysis view displaying the summary of the common data as present in the first database, the summary of the common data as present in the second database, and the at least one delta value for the common data between the first and second database.

A fourth aspect of the present invention provides a method for deploying an application for identifying data synchronization problems, comprising: providing a computer infrastructure being operable to: provide first and second databases containing common data; generate a summary of the common data as present in the first database; generate a summary of the common data as present in the second database; determine at least one delta value for the common data between the first and second databases; and generate an analysis view displaying the summary of the common data as present in the first database, the summary of the common data as present in the second database, and the at least one delta value for the common data between the first and second database.

A fifth aspect of the present invention provides computer software embodied in a propagated signal for identifying data synchronization problems, the computer software comprising instructions to cause a computer system to perform the following functions: provide first and second databases containing common data; generate a summary of the common data as present in the first database; generate a summary of the common data as present in the second database; determine at least one delta value for the common data between the first and second databases; and generate an analysis view displaying the summary of the common data as present in the first database, the summary of the common data as present in the second database, and the at least one delta value for the common data between the first and second database.

BRIEF DESCRIPTION OF THE DRAWINGS

These and other features of this invention will be more readily understood from the following detailed description of the various aspects of the invention taken in conjunction with the accompanying drawings in which.

Figure 1:
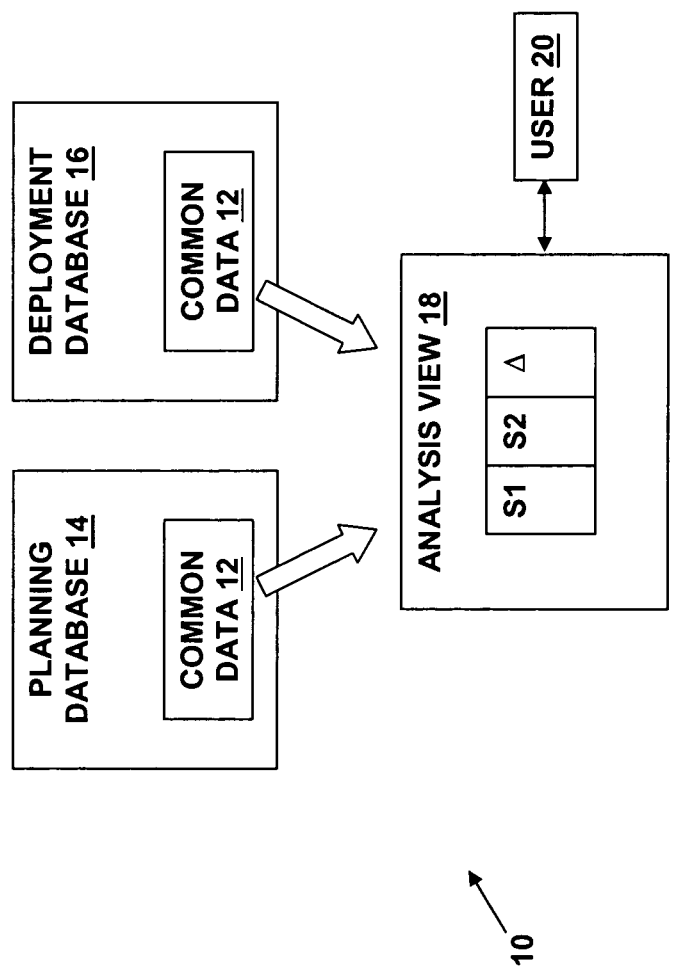
FIG. 1 depicts an illustrative system for identifying data synchronization problems between common data in different databases in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

An illustrative system 10 for identifying data synchronization problems between common data 12 in different databases 14, 16 in accordance with an embodiment of the present invention is depicted in FIG. 1. In this example, database 14 comprises a planning database for tracking the number of computer devices (e.g., laptops, desktops, etc.) deployed to each business area in an organization, while database 16 comprises a deployment database for tracking the actual deployment of computer devices by person, identifying the computer device(s) received by each person and the business area in the organization to which each person belongs. Thus, in this example, the common data 12 comprises the number of deployed computer devices. It will be apparent to those skilled in the art, however, that the present invention can also be used to identify data synchronization problems between common data in many other types of databases without departing from the intended scope of the present invention. The common data can be identified in databases 14, 16 using any suitable technique.

One or both of the databases 14, 16 is configured to generate an analysis view 18 that provides:
(A) A summary S1 of the common data 12 as present in database 14;
(B) A summary S2 of the common data 12 as present in database 16; and
(C) Delta(s) of the common data 12 between databases 14, 16. A delta value other than zero (0) indicates that the common data 12 in databases 14, 16 is not in sync. Such "out of sync" problems may be due to many different factors. For example, a non-zero delta value may indicate that the analysis view 18 needs to be updated (i.e., "refreshed") to incorporate newly added/changed common data entered into one or both of the databases 14, 16, or that an error (e.g., a loading error, data reset, etc.) has occurred in one or both of the databases 14, 16. Many other types of errors are also possible.

Figure 2:
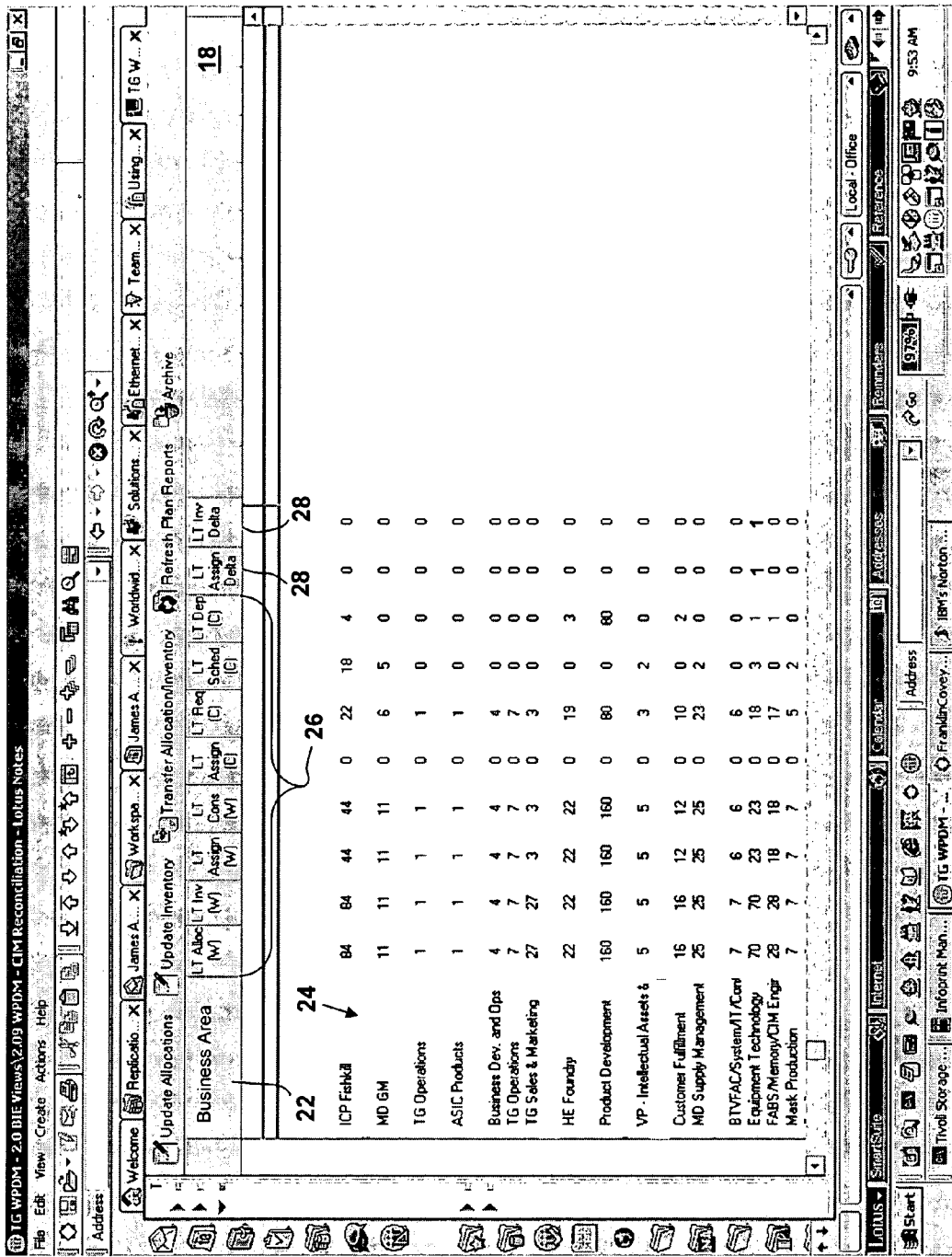
FIG. 2 depicts an illustrative screenshot of an analysis view for identifying data synchronization problems between common data in different databases in accordance with an embodiment of the present invention.

An illustrative screenshot of an analysis view 18 in accordance with an embodiment of the present invention is depicted in FIG. 2. In this example, the analysis view 18 displays a summary of the number of computer devices deployed by business area, as provided by database 12, and a summary of the number of computer devices deployed to individual persons, as provided by database 14, rolled up by business area. Advantageously, using the present invention, a user 20 (FIG. 1) can easily determine if the common data 12 in both databases 14, 16 is in sync.

The analysis view 18 includes a business area column 22 that displays the various business areas 24 of the organization. The analysis view 18 also includes a plurality of status columns 26 that display the number of computer devices of different statuses summarized by business area 24. In this example, the status columns 26 include the following, where (W) refers to data from database 14 (planning database) and (C) refers to data from database 16 (deployment database):
(A) LT Alloc (W)—Laptops Allocated;
(B) LT Inv (W)—Laptops in Inventory;
(C) LT Assign (W)—Laptops Assigned;
(D) LT Cons (W)—Consumption of Laptop Inventory;
(E) LT Assign (C)—Laptops Assigned;
(F) LT Req (C)—Laptops Requested;
(G) LT Sched (C)—Laptops Scheduled for Deployment; and
(H) LT Dep (C)—Laptops Deployed.

It should be noted that the specific status columns 26 presented in the analysis view 18 of FIG. 2, as well as the number of status columns 26, will generally be different for different applications of the present invention. As such, many other types of status columns 26 are possible. Accordingly, the specific status columns 26 presented in the analysis view 18 of FIG. 2 are not intended to limit the invention in any manner. Further, the common data 12 in the analysis view 18 need not be summarized according to business area as in the present example.

The analysis view 18 also includes at least one delta column 28 for displaying delta(s) of the common data 12 between databases 14, 16. In this example, the analysis view 18 includes a first delta column 28 "LT Assign Delta" and a second delta column 28 "LT Inv Delta," where:

$$LT\text{ Assign Delta}=LT\text{ Assign}(W)-(LT\text{ Assign}(C)+LT\text{ Req}(C)+LT\text{ Sched}(C)+LT\text{ Dep}(C));\text{ and} \quad (A)$$

$$LT\text{ Inv Delta}=LT\text{ Cons}(W)-(LT\text{ Req}(C)+LT\text{ Sched}(C)+LT\text{ Dep}(C)). \quad (B)$$

"LT Assign Delta" and "LT Inv Delta" have been specifically formulated in this example to help pinpoint what type of error may have occurred in one or more of the databases 14, 16. It will be apparent to one skilled in the art that many other types of delta(s) are also possible, depending on the type of data being summarized in the analysis view 18 and other factors. As such, the present invention is not intended to be limited by the examples described herein.

In FIG. 2, it can be seen that the "LT Assign Delta" delta column 28 and the "LT Inv Delta" delta column 28 both contain a "1" for the "Equipment Technology" business area 24. This can be seen by plugging in the appropriate values:

$$LT\text{ Assign Delta}=LT\text{ Assign}(W)-(LT\text{ Assign}(C)+LT\text{ Req}(C)+LT\text{ Sched}(C)+LT\text{ Dep}(C)),\text{ or }23-(0+18+3+1)=1;\text{ and}$$

$$LT\text{ Inv Delta}=LT\text{ Cons}(W)-(LT\text{ Req}(C)+LT\text{ Sched}(C)+LT\text{ Dep}(C)),\text{ or }23-(18+3+1)=1.$$

A "1" value in one or more delta columns 28 indicates that the common data 12 in databases 14, 16 is not in sync. Thus, a user can easily and quickly determine the presence of an error by looking for non-zero delta(s) in the delta columns 28 of the analysis view 18. A user can refresh the analysis view 18 by selecting the "Refresh Plan Reports" button 30 to ensure that the analysis view 18 reflects the most recent data. The refresh gathers the required data from databases 14, 16 and performs any necessary calculations to provide the summary and delta information for the analysis view 18. Indicators other than a "1" value for an "out of sync" condition can also be provided in a delta column 28.

Figure 3:
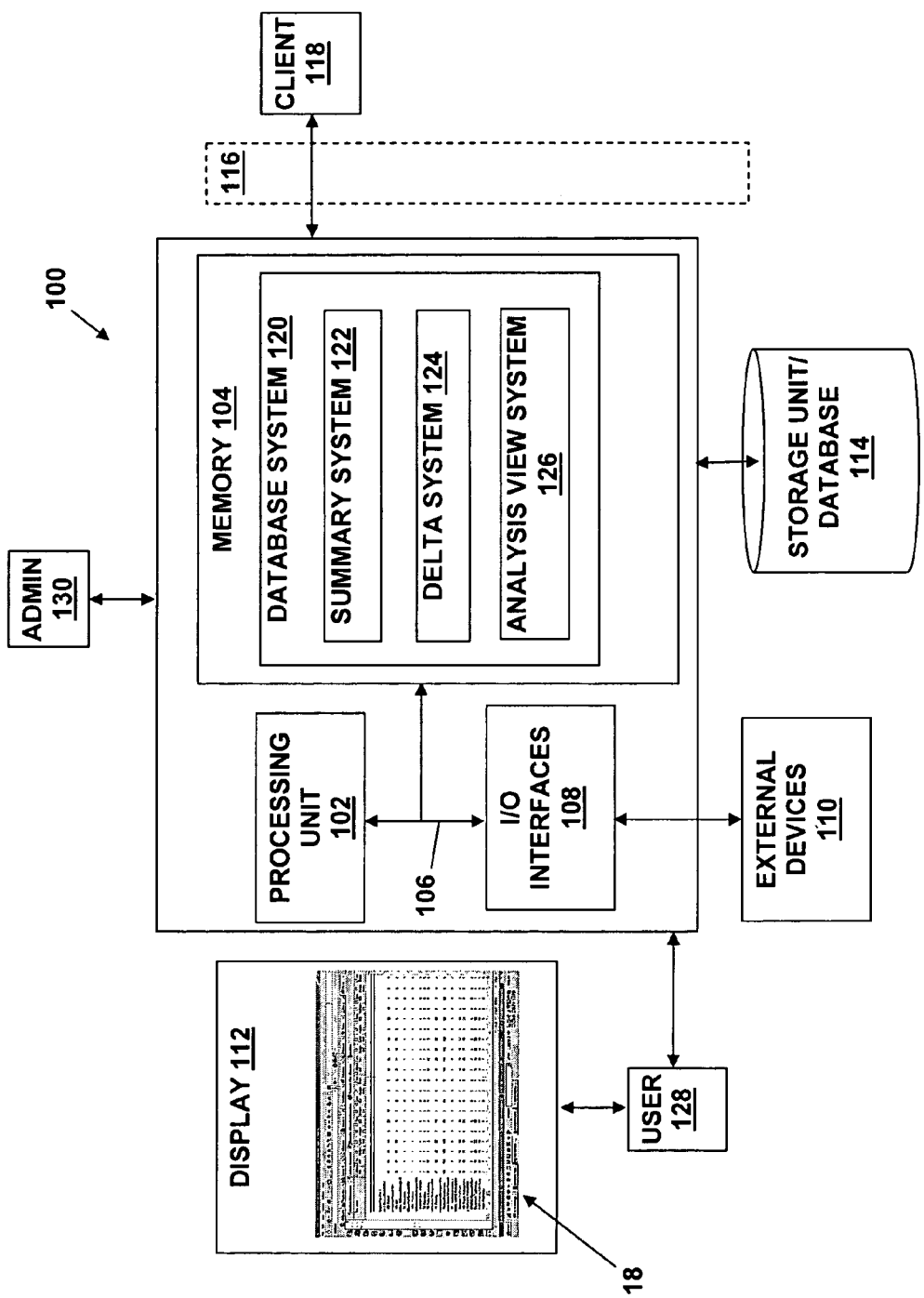
FIG. 3 depicts a computer system for implementing an embodiment of the present invention.

A computer system 100 for implementing an embodiment of the present invention is illustrated in FIG. 3. As shown, computer system 100 generally includes a processing unit 102, memory 104, bus 106, input/output (I/O) interface(s) 108, and external devices/resource(s) 110. Processing unit 102 may comprise a single processing unit, or may be distributed across one or more processing units in one or more locations. Memory 104 may comprise any known type of data storage and/or transmission media, including magnetic media, optical media, random access memory (RAM), read-only memory (ROM), etc. Moreover, similar to processing unit 102, memory 104 may reside at a single physical location, comprising one or more types of data storage, or be distributed across a plurality of physical systems in various forms.

I/O interface(s) 108 may comprise any system for exchanging information to/from an external source. External devices/resource(s) 110 may comprise any known type of external device, including speakers, a monitor/display (e.g., display 112), handheld device, keyboard, mouse, voice recognition system, speech output system, printer, facsimile, pager, etc.

Bus 106 provides a communication link between each of the components in computer system 100, and likewise may comprise any known type of transmission link, including electrical, optical, wireless, etc. In addition, although not shown, additional components, such as cache memory, communication systems, system software, etc., may be incorporated into computer system 100.

Data (e.g., planning data, deployment data, delta values, etc.) used in the practice of the present invention can be stored locally to computer system 100, for example, in storage unit/database 114, and/or may be provided to computer system 100 over a network 116. Storage unit/database 114 can be any system capable of providing storage for data and information under the present invention. As such, storage unit/database 114 may reside at a single physical location, comprising one or more types of data storage, or may be distributed across a plurality of physical systems in various forms. In another embodiment, storage unit/database 114 may be distributed across, for example, a local area network (LAN), wide area network (WAN) or a storage area network (SAN) (not shown).

Network 116 is intended to represent any type of network over which data can be transmitted. For example, network 116 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server. One or more client devices 118 may be connected to computer system 100 via network 116. Each client device 118 comprises components similar to those described above with regard to computer system 100.

Shown in memory 104 as a computer program product is a database system 120. Database system 120 includes a summary system 122 for generating predetermined summary information from a plurality of different databases (e.g., 2 databases as described above), a delta system 124 for determining predetermined delta information for the common data between the plurality of databases, and an analysis view system 126 for generating/displaying one or more analysis views 18 to a user 128 (e.g., on display 112) in accordance with the present invention. The predetermined summary information, predetermined delta information, and the type/content/format of the analysis view 18 provided to user 128 can be determined, for example, by user 128 or an administrator 130.

It should be appreciated that the teachings of the present invention can be offered as a business method on a subscription or fee basis. For example, one or more components of the present invention could be created, maintained, supported, and/or deployed by a service provider that offers the functions described herein for customers. That is, a service provider could be used to provide analysis views to identify data synchronization problems between common data in different databases, as described above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. For example, the present invention could also be used to provide analysis views to identify data synchronization problems between common data in more than two different databases (i.e., three or more databases). Such modifications and variations that may be apparent to a person skilled in the art are intended to be included within the scope of this invention as defined by the accompanying claims.

What is claimed is:

1. A method for identifying data synchronization problems, comprising:

retrieving, by a computer processor, planning data comprising information regarding a planned deployment of a plurality of devices from a first database (DB1), the planning data comprising: devices assigned (Dev Assign (DB1)); and consumption of devices in inventory ((Dev Cons (DB1));

retrieving, by the computer processor, deployment data comprising information regarding an actual deployment of the plurality of devices from a second database (DB2), the deployment data comprising: devices assigned (Dev Assign (DB2)); devices requested (Req Inv (DB2)); devices scheduled for deployment (Dev Sched (DB2)); and devices deployed ((Dev Dep (DB2));

generating, by the computer processor, a summary of common data, the common data comprising data that is stored in both the first and second databases, by comparing the retrieved planning data from the first database and the retrieved deployment data from the second database;

determining, by the computer processor, at least one delta value for the common data between the first and second databases, the at least one delta value comprising an assignment delta value (Dev Assig Delta) determined according to: Dev Assign Delta=Dev Assign (DB1)−(Dev Assign (DB2)+Dev Req (DB2)+Dev Sched (DB2)+Dev Dep (DB2));

generating, by the computer processor, an analysis view displaying, in a single display view, the summary of the common data in the first and second databases, and the at least one delta value for the common data between the first and second databases; and identifying, by the computer processor, based on the at least one delta value, a source of a data synchronization problem between the planning data in the first database and the deployment data in the second database.

2. The method of claim 1, further comprising:

refreshing the analysis view to include updated common data from the first and second databases if the data synchronization problem is indicated by the at least one delta value.

3. The method of claim 2, wherein the data synchronization problem is indicated by the at least one delta value, displayed in the analysis view, having a predetermined value other than zero, and wherein a non-zero value of the at least one delta value indicates that the analysis view displayed in the single display view needs to be refreshed to incorporate newly added or changed common data entered into one or both of the first database and the second database, or that an error has occurred in one or both of the first database and the second database.

4. The method of claim 1, wherein the at least one delta value comprises a device inventory delta value (Dev Inv Delta) determined according to: Dev Inv Delta=Dev Cons (DB1)−(Dev Req (DB2)+Dev Sched (DB2)+Dev Dep (DB2)).

5. A computer program product for identifying data synchronization problems, the computer program product comprising a non-transitory computer readable storage medium having program instructions embodied therewith, the program instructions executable by a computing device to cause the computing device to:
    retrieve planning data comprising information regarding a planned deployment of a plurality of devices from a first database (DB1), the planning data comprising: devices assigned (Dev Assign (DB1)); and consumption of devices in inventory ((Dev Cons (DB1));
    retrieve deployment data comprising information regarding an actual deployment of the plurality of devices from a second database (DB2), the deployment data comprising: devices assigned (Dev Assign (DB2)); devices requested (Req Inv (DB2)); devices scheduled for deployment (Dev Sched (DB2)); and devices deployed ((Dev Dep (DB2));
    generate a summary of common data, the common data comprising data that is stored in both the first and second databases, by comparing the retrieved planning data from the first database and the retrieved deployment data from the second database;
    determine at least one delta value for the common data between the first and second databases, the at least one delta value comprising an assignment delta value (Dev Assig Delta) determined according to: Dev Assign Delta=Dev Assign (DB1)−(Dev Assign (DB2)+Dev Req (DB2)+Dev Sched (DB2)+Dev Dep (DB2));
    generate an analysis view displaying, in a single display view, the summary of the common data in the first and second databases, and the at least one delta value for the common data between the first and second databases; and
    identify, based on the at least one delta value, a source of a data synchronization problem between the planning data in the first database and the deployment data in the second database.

6. The computer program product of claim 5, the program instructions executable by the computing device further causing the computing device to:
    refresh the analysis view to include updated common data from the first and second databases if the data synchronization problem is indicated by the at least one delta value.

7. The computer program product of claim 6, wherein the data synchronization problem is indicated by the at least one delta value, displayed in the analysis view, having a predetermined value other than zero, and wherein a non-zero value of the at least one delta value indicates that the analysis view displayed in the single display view needs to be refreshed to incorporate newly added or changed common data entered into one or both of the first database and the second database, or that an error has occurred in one or both of the first database and the second database.

8. The computer program product of claim 5, wherein the at least one delta value comprises a device inventory delta value (Dev Inv Delta) determined according to: Dev Inv Delta=Dev Cons (DB1)−(Dev Req (DB2)+Dev Sched (DB2)+Dev Dep (DB2)).

9. A system comprising:
    at least one computing device for implementing a method for identifying data synchronization problems, the method comprising:
    retrieving planning data comprising information regarding a planned deployment of a plurality of devices from a first database (DB1), the planning data comprising:
    devices assigned (Dev Assign (DB1)); and consumption of devices in inventory ((Dev Cons (DB1));
    retrieving deployment data comprising information regarding an actual deployment of the plurality of devices from a second database (DB2), the deployment data comprising: devices assigned (Dev Assign (DB2)); devices requested (Req Inv (DB2)); devices scheduled for deployment (Dev Sched (DB2)); and devices deployed ((Dev Dep (DB2));
    generating a summary of common data, the common data comprising data that is stored in both the first and second databases, by comparing the retrieved planning data from the first database and the retrieved deployment data from the second database;
    determining at least one delta value for the common data between the first and second databases, the at least one delta value comprising an assignment delta value (Dev Assig Delta) determined according to: Dev Assign Delta=Dev Assign (DB1)−(Dev Assign (DB2)+Dev Req (DB2)+Dev Sched (DB2)+Dev Dep (DB2));
    generating an analysis view displaying, in a single display view, the summary of the common data in the first and second databases, and the at least one delta value for the common data between the first and second databases; and
    identifying based on the at least one delta value, a source of a data synchronization problem between the planning data in the first database and the deployment data in the second database.

10. The system of claim 9, wherein the method further comprises:
    refreshing the analysis view to include updated common data from the first and second databases if the data synchronization problem is indicated by the at least one delta value.

11. The system of claim 10, wherein the data synchronization problem is indicated by the at least one delta value, displayed in the analysis view, having a predetermined value other than zero, and wherein a non-zero value of the at least one delta value indicates that the analysis view displayed in the single display view needs to be refreshed to incorporate newly added or changed common data entered into one or both of the first database and the second database, or that an error has occurred in one or both of the first database and the second database.

12. The system of claim 9, wherein the at least one delta value comprises a device inventory delta value (Dev Inv Delta) determined according to: Dev Inv Delta=Dev Cons (DB1)−(Dev Req (DB2)+Dev Sched (DB2)+Dev Dep (DB2)).

* * * * *